(Model.)

J. B. SWAIM.
CHURN DASHER.

No. 332,680. Patented Dec. 15, 1885.

WITNESSES:
Chas. Nida
C. Sedgwick

INVENTOR:
J. B. Swaim
BY Munn & Co.
ATTORNEYS.

UNITED STATES PATENT OFFICE

JOHN B. SWAIM, OF NEWBERN, INDIANA.

CHURN-DASHER.

SPECIFICATION forming part of Letters Patent No. 332,680, dated December 15, 1885.

Application filed April 7, 1885. Serial No. 161,486. (Model.)

*To all whom it may concern:*

Be it known that I, JOHN B. SWAIM, of Newbern, in the county of Bartholomew and State of Indiana, have invented a new and useful Improvement in Churn-Dashers, of which the following is a full, clear, and exact description.

Reference is to be had to the accompanying drawings, forming part of this specification, in which similar letters of reference indicate corresponding parts in both the figures.

Figure 1:
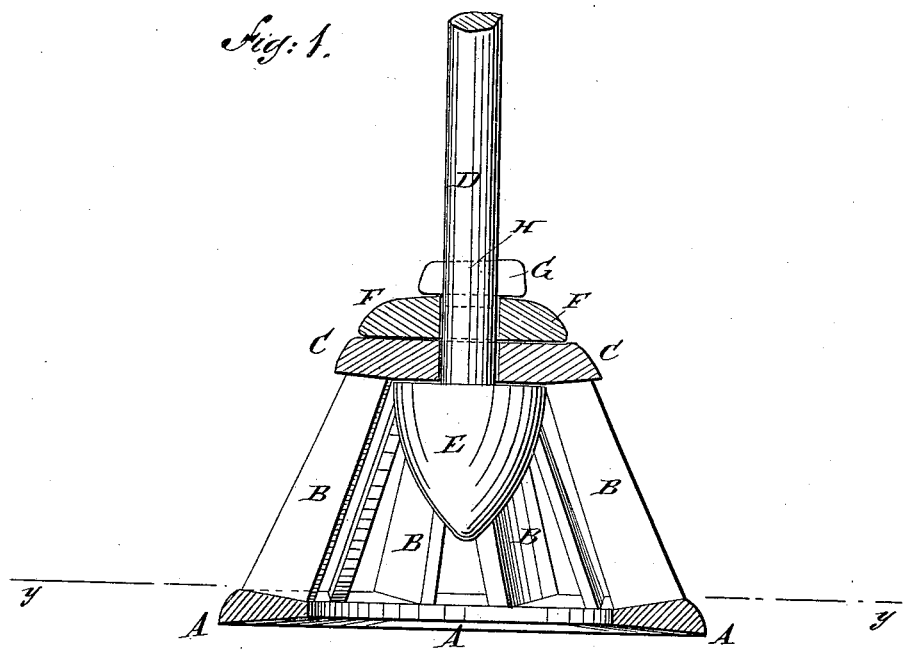
Figure 2:
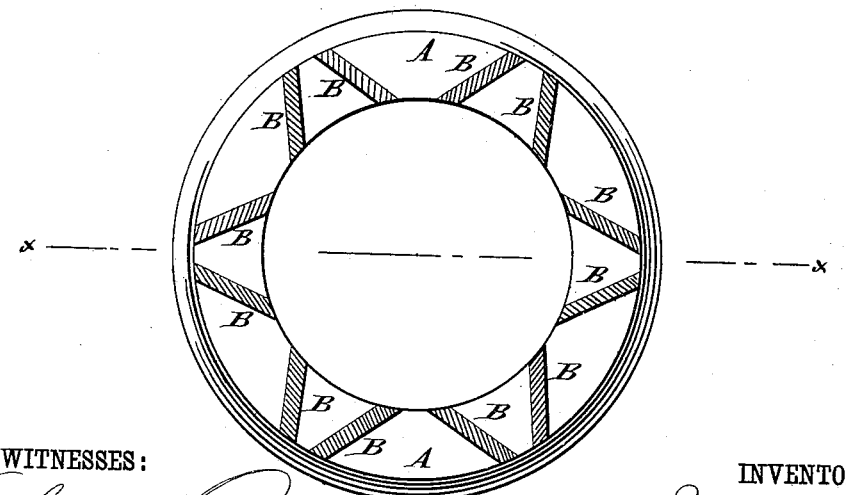

Figure 1 is a sectional side elevation of one of my improved churn-dashers, taken through the line $x\ x$, Fig. 2. Fig. 2 is a sectional plan view of the same, taken through the line $y\ y$, Fig. 1.

The object of this invention is to provide churn-dashers constructed in such a manner that they will move easily through the milk, will bring the butter quickly, will gather the butter into a mass, and can be readily cleaned.

The invention relates to a churn-dasher constructed with an annular base-plate, a circular top plate, inclined slats connecting the said base and top plates, and a handle having a conical knob on its lower end and secured in a hole in the said top plate by a key, as will be hereinafter fully described, and then claimed.

A is the annular base-plate of the dasher, which plate is slightly beveled inward upon both its lower and upper sides, as shown in Fig. 1. To the upper side of the annular base-plate A are attached the lower ends of a number of slats, B, which are arranged in pairs, the slats of each pair being arranged with their inner edges wider apart than their outer edges, and at the same distance from the radius passing midway between their said outer edges, as shown in Fig. 2. The slats B incline inward toward their upper ends, and their said upper ends are attached to a circular plate, C, which has a hole through its center for the passage of the dasher-handle D. Upon the lower end of the dasher-handle D is formed a conical knob, E, which rests against the lower side of the said circular plate C. The handle D also passes through a hole in the washer F, placed upon the upper side of the circular plate C, and which has its upper side convexed. The dasher-handle D is secured in place by a key, G, driven through a slot, H, in the said handle at the upper side of the washer F, as shown in Fig. 1. The washer F may be omitted, if desired, and the key G placed in contact with the circular plate C.

With this construction, as the dasher is forced downward, the annular base-plate A and the inclined slats B will tend to collect the milk into the interior of the dasher, and the conical knob E will force it outward. As the dasher moves upward the milk will be forced outward, or toward the walls of the churn, so that movement of the dasher will throw the milk into violent agitation, and will bring the butter in a very short time.

The peculiar construction of the dasher makes it very efficient in gathering the butter into a compact mass, and allows it to be readily taken apart for cleaning its various parts.

Having thus described my invention, I claim as new and desire to secure by Letters Patent—

1. A churn-dasher consisting, essentially, of an annular base-plate, a top plate, inclined spaced slats connecting the said plates, each pair of slats being wider apart at their inner than their outer edges, a cone-shaped projection extending downward within the space between the upper ends of the slats, and an operating-handle, substantially as set forth.

2. As an improved article of manufacture, the churn-dasher, consisting of the top plate, C, the annular base-plate A, inclined from its outer to its inner edges, as described, the slats B, connecting said plates and converging at their upper ends, each pair of said slats being wider apart at their inner than at their outer edges, the handle D, provided with the pointed or conical knob E, resting against the lower face of the top plate, and means for securing the handle to said top plate, substantially as set forth.

JOHN B. SWAIM.

Witnesses:
DAVID McCLINTIC,
JOHN M. BOYD.